Dec. 9, 1924.

R. V. LIPE

AUTOMOBILE BRAKE

Filed May 17, 1923

INVENTOR

Raleigh V Lipe

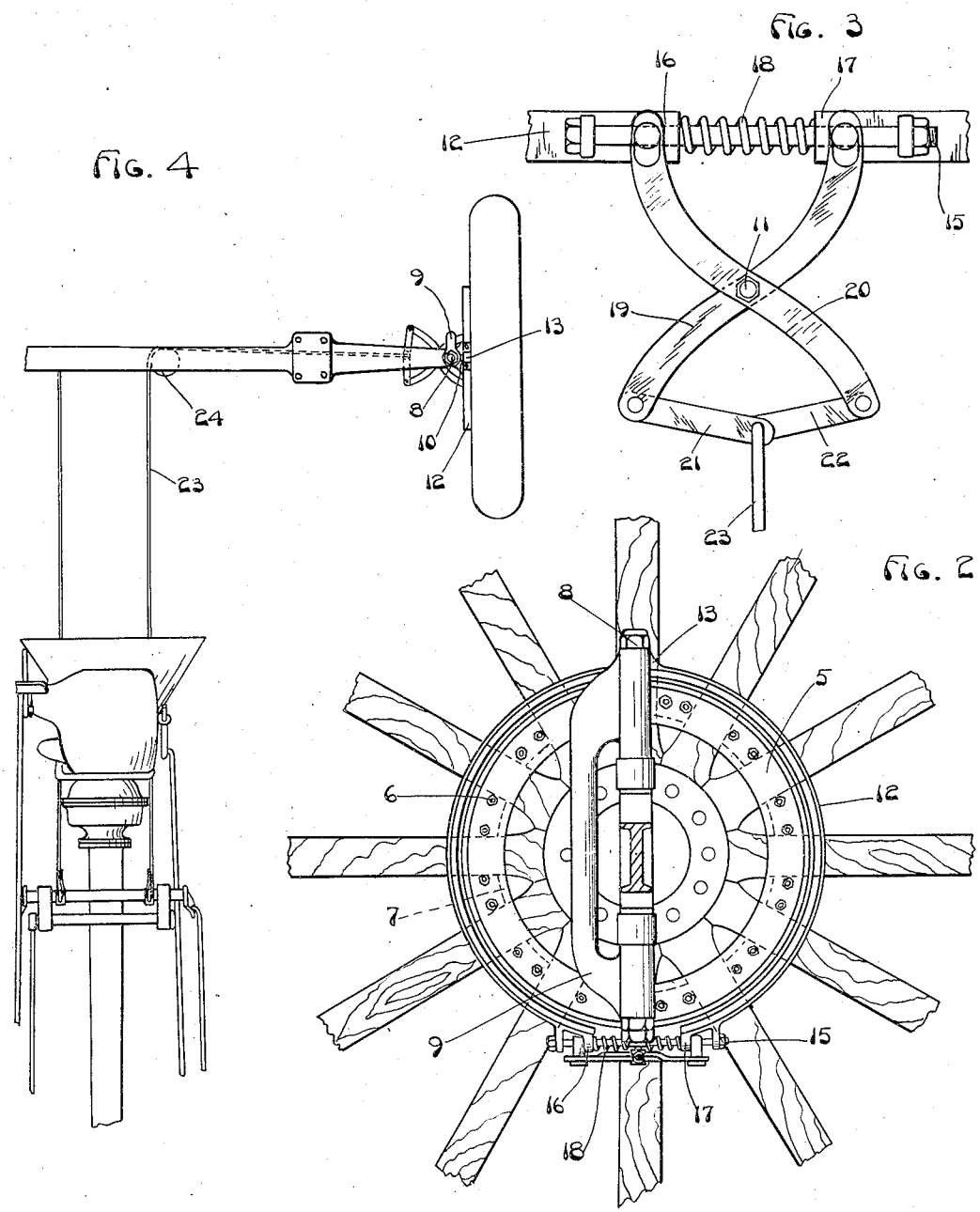

Patented Dec. 9, 1924.

1,518,860

UNITED STATES PATENT OFFICE.

RALEIGH V. LIPE, OF CINCINNATI, OHIO.

AUTOMOBILE BRAKE.

Application filed May 17, 1923. Serial No. 639,692.

*To all whom it may concern:*

Be it known that I, RALEIGH V. LIPE, a citizen of the United States, residing at Cincinnati, in the county of Hamilton and State of Ohio, have invented new and useful Improvements in an Automobile Brake, of which the following is a specification.

This invention relates to and has for an object to produce an attachment whereby brakes may be applied to the four wheels of a motor vehicle and particularly to the front wheels thereof.

An object is to produce a brake attachment in which the maximum of ease and efficiency is attained in the operation thereof and in which the attachment may be accomplished by the usual tool equipment of a vehicle owner without having to alter any portion of the car in the attaching operation.

These and other objects are attained in the brake described in the following specification and illustrated in the accompanying drawings, in which:—

Fig. 2 is a fragmental sectional view taken on the line 2—2 of Fig. 1.

Fig. 3 is an underside view of the mechanism for operating the brake and taken in the direction of the arrows applied to line 3—3 of Fig. 1.

Fig. 4 is a fragmental plan view of the vehicle chassis to which my improved brake has been attached.

Figure 1:
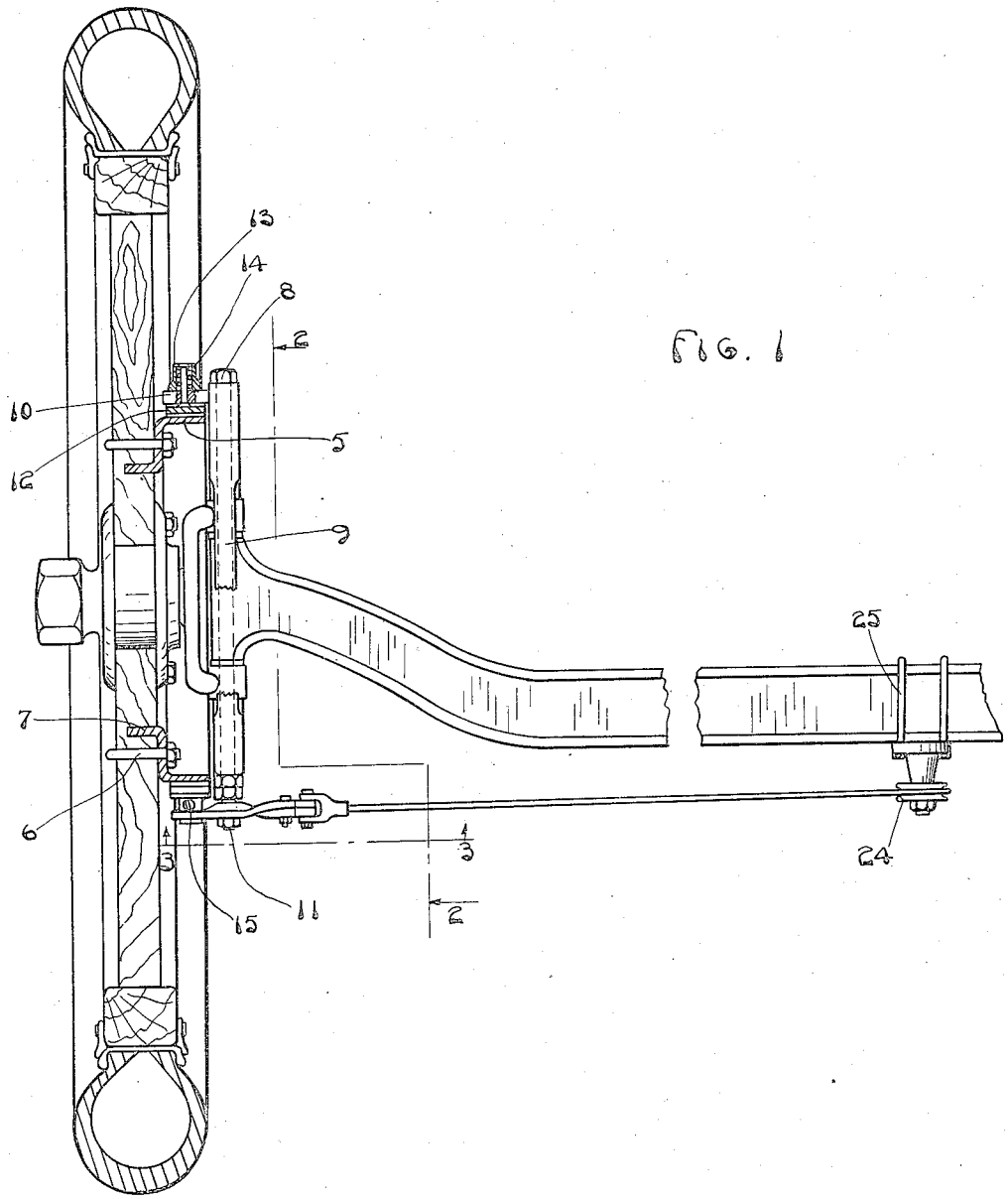
Fig. 1 is a partial sectional elevation of a front wheel and front axle of a vehicle having a brake embodying my invention attached thereto.

In my attachment I employ a brake drum 5 which is attached to the spokes of the wheel by means of a series of clips 6. Lugs 7 formed on the drum, extend between the adjacent spokes and serve to anchor the drum against shifting movement. In place of the usual bolt which attaches the spindle knuckle to the axle I substitute an elongated bolt 8 which passes through the end of the axle and the spindle knuckle and attaches thereto a yoke 9 which serves to retain the brake band in position on the drum. This is done by means of a lug 10 at the top of yoke 9 and an extension 11 of bolt 8 at the bottom of yoke 9. The band 12 is provided at its top with the usual cap 13 which contains a spring 14 so that the band is normally lifted from the drum but is free to be brought into engagement therewith when the brake is operated. The ends of the band are connected by a bolt 15 which passes loosely through lugs 16 and 17 on the ends of the band, a spring 18 being located on the bolt between the lugs to hold the ends of the band apart normally. Bearing against the outer sides of the lugs are the ends of a pair of brake operating links 19 and 20, which also slide upon the bolt ends. The opposite ends of the links 19 and 20 are connected with toggle links 21 and 22 which have their ends joined to an operating cable 23. The cable passes over a pulley 24 which is attached to the axle by clips 25 as shown.

Each front wheel is similarly equipped with a brake and the operating mechanism is connected with the existing rear brake operating mechanism, or the vehicle may be equipped with my improved front wheel brakes and the same operating mechanism employed to actuate the four brakes of the vehicle simultaneously. The operation of the construction I have thus described is self evident and further elaboration of the description is deemed unnecessary.

Having thus described my invention what I claim is:—

In combination with the front wheel and steering knuckle of a motor vehicle, a brake drum attached to the spokes of the wheel, a yoke embracing the steering knuckle and attached thereto above and below for movement as a unit therewith, a brake band encircling the brake drum and attached between its ends to the yoke at its top, toggle links connected to the ends of the band and fulcrumed on the yoke at its bottom, and means adapted to operate the links.

In witness whereof, I affix my signature in the presence of two witnesses.

RALEIGH V. LIPE.

Witnesses:
CHAS. W. POTTER,
WILLIAM J. SCHULTZ.